May 30, 1933.  L. F. DEFENBAUGH  1,911,885
INDICATOR FOR ADJUSTABLE FLOW BEANS
Filed Dec. 27, 1932

Inventor
Loyd F. Defenbaugh
By Robt. E. Barry
Attorney

Patented May 30, 1933

1,911,885

UNITED STATES PATENT OFFICE

LOYD F. DEFENBAUGH, OF OKLAHOMA CITY, OKLAHOMA, ASSIGNOR TO PHILLIPS PETROLEUM COMPANY, OF BARTLESVILLE, OKLAHOMA, A CORPORATION

INDICATOR FOR ADJUSTABLE FLOW BEANS

Application filed December 27, 1932. Serial No. 649,080.

This invention relates to improvements in combination flow heads and adjustable flow beans for oil wells or the like, and the primary object of the invention is to specifically improve the device disclosed in the D. R. Knowlton U. S. Patent No. 1,831,713, dated November 10, 1931. That patent discloses a cruci-form fitting having an inlet at its lower end communicating with the upper end of a well conduit and having a lateral port communicating with a flow line that leads the fluid from the fitting to an oil and gas separator. A tubular flow restricting member is removably arranged in the fitting and cooperates with a tapered or substantially cone-shaped valve. In accordance with the present invention, improved means have been devised for indicating the size of the opening through the bean.

With the foregoing object outlined and with other objects in view which will appear as the description proceeds, the invention consists in the novel features hereinafter described in detail, illustrated in the accompanying drawing, and more particularly pointed out in the appended claim.

Figures 1, 2:
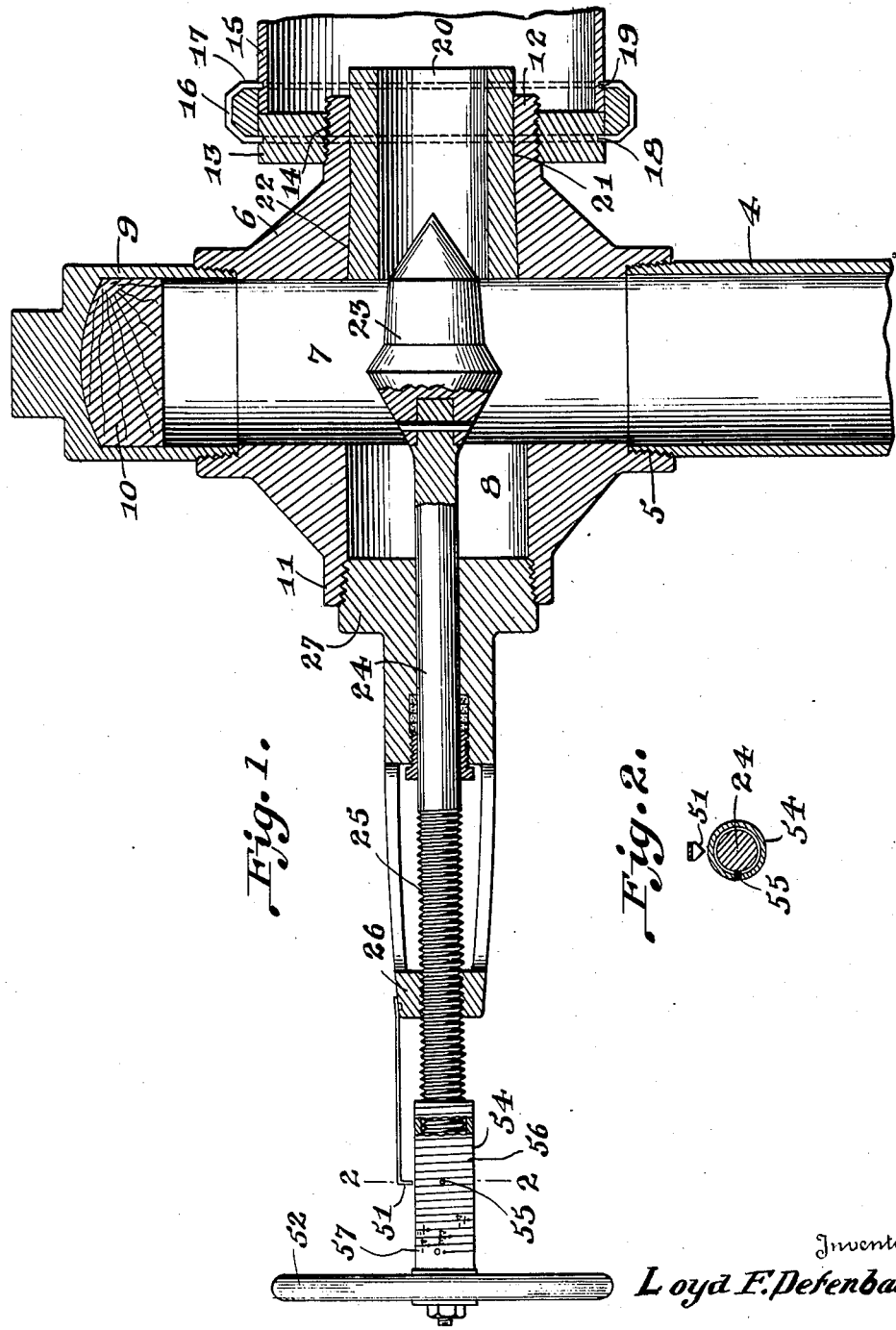
Fig. 1 is a vertical sectional view of one form of a combination flow head and adjustable flow bean with my indicating means attached thereto.
Fig. 2 is a vertical sectional view of a portion of the same taken on the line 2—2 of Fig. 1.

Referring to the drawing, 4 designates a vertical well conduit, to the upper end of which is connected by any suitable means such as the threaded joint 5, a cruci-form metal fitting 6 which forms communicating vertical and horizontal passageways 7 and 8. The lower end of the passageway 7 communicates with the conduit 4, and its upper end is closed by a bull plug 9 having a shock absorbing insert 10 of wood or the like.

The fitting forms a pair of oppositely disposed lateral nipples 11 and 12, the former having internal threads and the latter external threads. In the construction shown in said patent, a swaged or flared tubular member is connected to the nipple 12, and this necessitates the placing of the joint connecting the flow pipe to said swage at a point some distance from the extremity of the nipple 12. This disadvantage has been eliminated by placing a blank flange or ring 13 directly on the nipple and joined to the latter by a threaded connection 14. This permits the flow pipe 15 to be directly connected to the blank flange by means of a split sleeve coupling 16 of the type having lips 17 which fit into grooves 18 and 19 in the blank flange and flow pipe. Of course, fluid-tight joints are provided by such means.

A tubular flow restricting member 20 of any desired size is removably arranged in a port 21 formed by the nipple 12, and said port is provided with a frusto-conical seat 22 to receive the complimentary surface of the member 20. It will be noted that the external diameter of the member 20 is less than the diameter of the port in the nipple 11, so that the member 20 can be inserted or removed through the nipple 11.

Like in the above mentioned patent, the flow restricting member cooperates with a valve head 23 which is preferably of substantially conical shape and moves into and out of the flow restricting member; said head being controlled by a manually operated stem 24 having threads 25 that engage the threads of a nut 26, which is preferably part of a threaded plug 27 that normally closes the port in the nipple 11.

In accordance with the present invention, the plug which supports the valve stem has a pointer 51 attached thereto, and when the hand wheel 52 is removed from the threaded stem 24, a calibrated sleeve 54 of greater internal diameter than the external diameter of the threaded portion 25 of the stem may be slid on the stem and be secured in any desired position by any suitable means such as a set screw 55, which extends through the sleeve and impinges against the stem. The sleeve is provided with a helical groove or line 56 which coincides with the threads of the stem, and suitable indicating marks 57 are arranged along the groove to cooperate with the pointer and indicate the degree of opening of the valve.

It will be observed that the pointer is stationary on the plug, and the scale is marked on the sleeve 54 which fits over the stem. The sleeve is set at zero when the bean is closed, and is then held in this position by means of the screw 55. In operation, as the stem travels out in opening the bean, the pointer follows the spiral line and points to the area of opening as indicated by the numbers which are stamped on the line at proper points. This arrangement has advantages over the known types of indicators, as the use of a sleeve and spiral line provides increased space for the arrangement of indicating numerals. Furthermore, the device is in the nature of an attachment and can be connected to flow beans of conventional types, and the sleeve 54 can be adjusted on the stem to accommodate flow restricting members 20 of various lengths and inside diameters.

The invention claimed herein was first disclosed in an application filed jointly by D. R. Knowlton and myself on December 12, 1931, Serial No. 580,668.

From the foregoing it is believed that the construction, operation and advantages of my improved device may be readily understood, and it is manifest that changes may be made in the details disclosed, without departing from the spirit of the invention, as expressed in the claim.

What I claim and desire to secure by Letters Patent is:

In combination, a fitting provided with a projecting rotatable threaded stem, a wheel detachably secured to the outer end of said stem, a stationary nut with which the stem cooperates, a stationary pointer, a sleeve surrounding the threaded portion of the stem, the internal diameter of the sleeve being greater than the external diameter of the threaded portion of the stem to permit the sleeve to be slid along the stem, means for adjustably securing the sleeve to the stem, said sleeve being provided with a helical line coinciding with the threads of the stem, and indicating characters arranged along said line and cooperating with the pointer.

In testimony whereof, I hereto affix my signature.

LOYD F. DEFENBAUGH.